United States Patent
Haider (10) Patent No.: US 10,942,959 B1
(45) Date of Patent: Mar. 9, 2021

(54) AUTHENTICATED FORM COMPLETION USING DATA FROM A NETWORKED DATA REPOSITORY

(71) Applicant: Wells Fargo Bank, N.A., San Francisco, CA (US)

(72) Inventor: Imran Haider, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 293 days.

(21) Appl. No.: 15/890,221

(22) Filed: Feb. 6, 2018

(51) Int. Cl.
*G06F 16/33* (2019.01)
*G06F 16/335* (2019.01)
*G06F 21/32* (2013.01)
*H04L 29/08* (2006.01)
*G06F 16/9535* (2019.01)
*G06Q 50/00* (2012.01)

(52) U.S. Cl.
CPC ........ *G06F 16/335* (2019.01); *G06F 16/3349* (2019.01); *G06F 16/9535* (2019.01); *G06F 21/32* (2013.01); *H04L 67/20* (2013.01); *G06Q 50/01* (2013.01)

(58) Field of Classification Search
CPC .............. G06F 16/335; G06F 16/9535; G06F 16/3349; G06F 21/32; G06F 50/01; H04L 67/20
USPC .................................................. 707/705, 754
See application file for complete search history.

(56) References Cited

U.S. PATENT DOCUMENTS

| | | | |
|---|---|---|---|
| 5,521,815 A | 5/1996 | Rose, Jr. | |
| 5,978,774 A | 11/1999 | Rogers et al. | |
| 6,085,172 A | 7/2000 | Junger | |
| 6,587,835 B1 | 7/2003 | Treyz et al. | |
| 6,850,902 B1 | 2/2005 | Finch | |
| 6,898,598 B2 | 5/2005 | Himmel et al. | |
| 6,912,507 B1 | 6/2005 | Phillips et al. | |
| 6,934,686 B1 | 8/2005 | Rajagopalan | |
| 7,162,451 B2 | 1/2007 | Berger et al. | |
| 7,266,533 B2 | 9/2007 | Karas et al. | |

(Continued)

OTHER PUBLICATIONS

Corcoran, Cate T., "Caught in a Cloud: Technology Revolution Reinventing Retail" WWD: Women's Wear Daily; Los Angeles vol. 199, Iss. 13 (Jan. 20, 2010): 1. (Year: 2010. 4 pages.

(Continued)

*Primary Examiner* — Hares Jami
(74) *Attorney, Agent, or Firm* — Foley & Lardner LLP (57) ABSTRACT

Systems, methods, and apparatuses for automated population of responses into query fields of a form are discussed. The responses are based on data in a networked user data repository maintained by a first party, and the form is presented by a second party. A login request for access to data in the user data repository may be received from a remote computing device. If access to the data in the user data repository is authorized, descriptors for at least one of the query fields may be received, and based on the descriptors, it may be determined whether any responses to any query fields are contained in the user data repository. Query fields may be populated with responses obtained through the data repository. The user provides the second party with information that is made available to the first party without separately inputting the information into the form of the second party.

30 Claims, 6 Drawing Sheets

(56) References Cited

U.S. PATENT DOCUMENTS

| | | | |
|---|---|---|---|
| 7,343,551 B1* | 3/2008 | Bourdev | G06F 40/174 715/224 |
| 7,778,934 B2 | 8/2010 | Graves et al. | |
| 7,991,652 B2 | 8/2011 | Chamberlain | |
| 8,117,444 B2 | 2/2012 | Takatori et al. | |
| 8,260,806 B2 | 9/2012 | Steele et al. | |
| 8,612,349 B1 | 12/2013 | Ledder et al. | |
| 8,646,060 B1 | 2/2014 | Ben Ayed | |
| 8,825,757 B2 | 9/2014 | Lunt et al. | |
| 8,977,408 B1 | 3/2015 | Cazanas et al. | |
| 9,292,484 B1* | 3/2016 | Plow | G06F 40/174 |
| 10,217,108 B1 | 2/2019 | Hecht | |
| 10,572,725 B1* | 2/2020 | Becker | G06K 9/00442 |
| 2001/0053980 A1 | 12/2001 | Suliman et al. | |
| 2002/0179704 A1 | 12/2002 | Deaton | |
| 2003/0028427 A1 | 2/2003 | Dutta et al. | |
| 2003/0130907 A1 | 7/2003 | Karas et al. | |
| 2005/0097320 A1 | 5/2005 | Golan et al. | |
| 2005/0210263 A1 | 9/2005 | Levas et al. | |
| 2006/0179404 A1* | 8/2006 | Yolleck | G06F 40/174 715/272 |
| 2006/0259380 A1 | 11/2006 | Milstein et al. | |
| 2007/0162338 A1 | 7/2007 | Lawe | |
| 2007/0168175 A1* | 7/2007 | Fux | G06F 1/1626 704/3 |
| 2008/0010298 A1 | 1/2008 | Steele et al. | |
| 2008/0052184 A1 | 2/2008 | Junger et al. | |
| 2008/0071627 A1 | 3/2008 | Junger | |
| 2009/0006646 A1* | 1/2009 | Duarte | G06F 40/174 709/236 |
| 2009/0076966 A1 | 3/2009 | Bishop et al. | |
| 2009/0083847 A1* | 3/2009 | Fadell | G06K 9/00248 726/16 |
| 2009/0132392 A1 | 5/2009 | Davis et al. | |
| 2009/0132415 A1 | 5/2009 | Davis et al. | |
| 2009/0234764 A1 | 9/2009 | Friesen | |
| 2010/0005034 A1* | 1/2010 | Carpenter | G06Q 40/06 705/36 R |
| 2010/0137008 A1* | 6/2010 | Li | H04L 67/125 455/466 |
| 2010/0250364 A1 | 9/2010 | Song et al. | |
| 2011/0004921 A1 | 1/2011 | Homer et al. | |
| 2011/0022483 A1 | 1/2011 | Hammad | |
| 2011/0035788 A1 | 2/2011 | White et al. | |
| 2011/0106698 A1 | 5/2011 | Isaacson et al. | |
| 2011/0179061 A1* | 7/2011 | Chilakamarri | G06Q 10/00 707/769 |
| 2012/0022944 A1 | 1/2012 | Volpi | |
| 2012/0041877 A1 | 2/2012 | Rao | |
| 2012/0066262 A1 | 3/2012 | Greenberg | |
| 2012/0150643 A1 | 6/2012 | Wolfe et al. | |
| 2012/0150731 A1 | 6/2012 | Isaacson et al. | |
| 2012/0150743 A1 | 6/2012 | Isaacson et al. | |
| 2012/0191615 A1 | 7/2012 | Schibuk | |
| 2012/0203750 A1* | 8/2012 | Vaananen | G06Q 30/0619 707/706 |
| 2012/0239581 A1 | 9/2012 | Mosher | |
| 2013/0024327 A1 | 1/2013 | Nargizian | |
| 2013/0073365 A1 | 3/2013 | McCarthy | |
| 2013/0198598 A1* | 8/2013 | Kirsch | G06F 40/174 715/226 |
| 2013/0332342 A1 | 12/2013 | Kasower | |
| 2013/0332826 A1 | 12/2013 | Karunamuni et al. | |
| 2013/0340052 A1 | 12/2013 | Jakobsson | |
| 2014/0214626 A1 | 7/2014 | Bowers et al. | |
| 2014/0244487 A1 | 8/2014 | Seligmann et al. | |
| 2014/0379521 A1* | 12/2014 | Novotny | G06Q 30/0201 705/26.7 |
| 2015/0052064 A1 | 2/2015 | Karpenko et al. | |
| 2015/0128241 A1 | 5/2015 | Jakobsson | |
| 2015/0220924 A1 | 8/2015 | Bakker | |
| 2015/0248664 A1 | 9/2015 | Makhdumi et al. | |
| 2015/0339652 A1 | 11/2015 | Park et al. | |
| 2015/0356562 A1 | 12/2015 | Siddens et al. | |
| 2016/0062972 A1* | 3/2016 | Ramakrishnan | G06Q 40/02 715/226 |
| 2016/0203213 A1* | 7/2016 | Lewis | H04L 63/123 707/737 |
| 2016/0239887 A1 | 8/2016 | Zhao et al. | |
| 2017/0262421 A1* | 9/2017 | Yue | H04L 63/0807 |
| 2018/0181866 A1* | 6/2018 | Dalle | G06N 20/00 |
| 2018/0314711 A1* | 11/2018 | Botner | G06F 16/258 |
| 2019/0108909 A1* | 4/2019 | Lee | G01C 21/3697 |

OTHER PUBLICATIONS

"Use AutoFill for credit cards, contacts, and passwords"; https://support.apple.com/guide/safari/use-autofill-ibrw1103; 2018. 2 pages.

Dashlane; "Never forget another password"; https://www.dashlane.com/;2018. 8 pages.

Dashlane; "The most accurate way to autofill forms on the web"; https://www.dashlane.com/features/autofill; 2018. 8 pages.

Gaunt, Matt; "Deep Dive into the Payment Request API"; https://developers.google.com/web/fundamentals/payments/deep-dive-into-payment-request; Jan. 9, 2018. 53 pages.

McCormick et al.; "Payment Request API"; https://docs.microsoft.com/en-us/microsoft-edge/dev-guide/device/payment-request-api; May 24, 2017. 9 pages.

* cited by examiner

AUTHENTICATED FORM COMPLETION USING DATA FROM A NETWORKED DATA REPOSITORY

TECHNICAL FIELD

Embodiments of the present disclosure relate generally to systems and methods for authenticated form completion, and more specifically, to automated population of query fields using networked data from one or more user accounts.

BACKGROUND

Users are often provided with fillable forms to complete when visiting webpages of merchants or other organizations. This can occur, for example, when a user wishes to purchase an item and the user is asked to register for a user account and/or to provide payment information. In other situations, the user may wish to register for a class, provide information to a governmental body, or otherwise submit information to another party. Frequently, some or all of the information requested by one organization in such forms was previously entered into a form of another organization, or was otherwise provided to one or more other organizations. Users are thus frequently asked to input and re-input the same information into fields of multiple forms, a task that can be tedious, especially if the manner of inputting the data is via a potentially small virtual keyboard of a smartphone or other mobile device.

Some web browsers provide "autofill" functionality that automatically enters ("fills") basic information, like name and address, into certain fields of some forms. However, conventional autofill features suffer from several shortcomings. For example, if the autofill function is enabled in a web browser, the web browser enters the information automatically without regard for who is currently using the browser. Consequently, a browser may autofill a field with the personal information of one user, and that personal information would then be viewable to another user who uses the browser and who comes upon a form with one or more of the same fields previously completed by the first user.

Additionally, autofill data is normally stored locally, and consequently, data entered in a prior form is subsequently only available when using the same device on which the form was previously completed. User data would thus have to be entered on every device for all user data to be available on all of the user's devices.

Moreover, users may use more than one browser to surf the web on any one device, alternating between such browsers as Google Chrome, Internet Explorer, Microsoft Edge, etc. This might be because a user prefers one browser with certain websites and another browser for other websites, or this might be because one browser is a default browser launched by certain applications, but the default browser is not always the chosen browser when the user is manually launching a browser. Autofill data is saved by one browser, and subsequently accessible to that same browser only, requiring a user to re-enter certain information if the same browser is not being used.

Further, only information previously entered via that browser is available for autofill. Consequently, if a form asks for information that was not previously entered into a form, that data is not available for autofill, even though the information may otherwise be available somewhere electronically.

What is needed are systems and methods that address one or more of the above, as well as other, shortcomings.

SUMMARY

Various example embodiments relate to systems, methods, and apparatuses for automated population of one or more responses into one or more query fields of a form. In certain embodiments, the responses are based on data in a networked user data repository maintained by a first party, and the form is presented to a user by a second party. A login request for access to data in the user data repository may be received from a remote computing device via a communications network. The login request may have been received via a network application through which the user is presented with the form, the network application being executed on the remote computing device. It may be determined whether to authorize access to the data in the user data repository in response to the login request. In response to access to the data in the user data repository being authorized, one or more descriptors for at least one of the query fields may be obtained, the one or more descriptors characterizing responses requested by the second party via corresponding query fields. Based on the one or more descriptors, it may be determined whether any responses to any query fields are contained in the user data repository. One or more responses to one or more of the query fields in the form may be sent to the remote computing device. One or more query fields may be populated with responses obtained through the networked user data repository.

In various implementations, the approach may be implemented by a central computing device of the first party, and the central computing device may be communicatively coupled with the remote computing device via the communications network. The central computing device may also be communicatively coupled to a third-party computing device of a third party, and the central computing device may be configured to receive user data from the third-party computing device for storage in the data repository. The data repository may be maintained at a central computing device of the first party. The data repository may include internal data associated with one or more user accounts maintained by the first party in one or more internal databases. The data repository may also include external data acquired by the central computing device from a third party computing device via the communications network. The external data may be associated with a user account maintained by the third party in one or more external databases. The central computing device may have been required to provide authenticating information to the third party computing device to access to the external data.

In various configurations, the automatically-populated form may include information provided to the first party without the information being separately re-input into the form of the second party. The form may be submitted via the network application, the submitted form including one or more query fields populated with responses obtained through the networked user data repository. The network application may be a web browser or a mobile device application. Determining whether any responses to any query fields are contained in the data repository may comprise searching one or more documents in the data repository for the field descriptors, and retrieving values near the field descriptors in documents with the field descriptors. Determining whether any responses to any query fields are contained in the data repository may also comprise searching one or more documents in the data repository for synonyms of terms in the field descriptor to determine whether any responses to any query fields are contained in the data repository.

In various potential implementations, determining whether to authorize access to the data in the user data repository includes receiving user credentials entered by the user into the remote computing device, and authenticating the user based at least in part on the credentials received. The login request may be received after the remote computing device authenticates the user. The remote computing device may biometrically authenticate the user after the user requests access to data in the user data repository. The user data repository may include data extracted from one or more social media accounts of the user, data extracted from one or more documents uploaded by the user, and/or data extracted from one or more electronic mail accounts of the user.

In different versions, the user data repository is associated with a user account of the user, wherein the user account is a financial account of the user held by the first party. The user data repository may include data from the financial account. Determining whether to authorize access to the data in the user data repository may include authenticating the user as though the user is accessing the financial account. The user data repository may include data extracted from one or more financial accounts held by a third party. The user data repository may be linked with one or more external accounts maintained by parties other than the first and second parties such that data that is updated in the external accounts subsequent to account linking is accessible to the user data repository. The user data repository may include data obtained from at least one account maintained by a third party. Before determining whether any responses to any of the query fields are contained in the user data repository, one or more of the at least one account may be accessed to retrieve data corresponding to at least one of the field descriptors. Multiple potential responses available for one of the query fields in the form may be presented via a display. A selection of one of the multiple potential responses for the corresponding query field may be accepted via a user interface associated with the display. The corresponding query field may be populated with the selection.

In other embodiments, a system for automated population of one or more responses into one or more query fields of a form comprises a central computing device of a first party. The central computing device may include a network interface, wherein the central computing device is communicatively coupled with a remote computing device via the network interface. The central computing device may also include a user data repository with information responsive to one or more query fields of the form. The central computing device may moreover include a processor, and a memory having instructions that, when executed by the processor, are configured to direct the central computing device. The central computing device may receive, from the remote computing device and via the network interface, a login request for access to data in the user data repository. The login request may have been received via a network application through which the form is presented. The network application may be executed on the remote computing device. The form may be presented by a second party. It may then be determined whether to authorize access to the data in the user data repository in response to the login request. If access to the data in the user data repository is authorized, the central computing device may obtain from the remote computing device one or more descriptors for at least one of the query fields, the one or more descriptors characterizing responses requested by the second party via corresponding query fields. The central computing device may determine, based on the one or more descriptors, whether any responses to any query fields are contained in the user data repository. The central computing device may send, to the remote computing device, one or more responses to one or more of the query fields in the form. And the central computing device may populate, via the network application, one or more query fields with responses obtained through the user data repository.

In various configurations, to determine whether any responses to any query fields are contained in the data repository, the central computing device may be configured to search one or more documents in the data repository for the field descriptors, and retrieve values near the field descriptors in documents with the field descriptors. The system may further include the remote computing device with which the central computing device is communicatively coupled. the remote computing device may be configured to transmit, to the central computing device, user credentials entered by a user into the remote computing device. The central computing device may be configured to determine whether to authorize access to the data in the user data repository based at least in part on the user credentials. The central computing device may be configured to obtain, for the user data repository, data from at least one of a social media account, an electronic mail account, and a financial account of a user presented with the form to be completed. The user data repository may be associated with a financial account of a user, the financial account being held by the first party, and the user data repository may include data obtained from the financial account. The central computing device may be configured to determine whether to authorize access to the data in the user data repository by authenticating the user as though the user is accessing the financial account. The user data repository may include data from at least one account maintained by a third party, and the central computing device may be configured to, before determining whether any responses to any of the query fields are contained in the user data repository, access one or more of the at least one account to retrieve data corresponding to at least one of the field descriptors. The central computing device may be configured to present to the remote computing device multiple potential responses available for one of the query fields in the form, and accept a selection from the remote computing device of one of the multiple potential responses for the corresponding query field. The corresponding query field may be populated with the selection.

In other embodiments, a computer-implemented method for automated population of one or more responses into one or more query fields of a form is provided. The responses may be based on data stored in a networked user data repository maintained by a first party, and the form may be presented to a user by a second party. An autofill link may be provided for requesting access to data stored in the user data repository. Upon selection of the autofill link by the user, the user of the user computing device may be authenticated as being authorized to access data in the user data repository. A login request for access to data in the user data repository may be transmitted to a remote computing device. The login request may be transmitted via the web browser or mobile application through which the user is presented with the form. One or more descriptors for at least one of the query fields may be provided to the remote computing device. The one or more descriptors may characterize responses requested by the second party via corresponding query fields. One or more responses to one or more of the query fields in the form may be received from the remote computing device. One or more query fields may be populated with responses obtained from the networked user data repository. The user may submit the form with one or more automatically-populated query fields to provide the second party with information previously provided to the first party without separately inputting the information into the form of the second party. Before one or more query fields are populated with responses, the user may be presented with multiple potential responses available for one of the query fields in the form. A selection of one of the multiple potential responses for the corresponding query field may be accepted from the user, and the corresponding query field may be populated with the selection.

Embodiments of the present disclosure provide for a more convenient manner of automatically and securely completing query fields in forms using data obtained from multiple sources. These and other features and benefits, together with the organization and manner of operation thereof, will become apparent from the following detailed description when taken in conjunction with the accompanying drawings.

DETAILED DESCRIPTION

The present disclosure relates to systems, methods, and apparatuses for enhanced population of query fields of forms. In example embodiments, a user encountering a form in, for example, a web browser, mobile device application, or other network application for receiving and/or sending information via the internet or other network, may employ an population approach that taps data in a networked user data repository for potential responses to query fields in the form. Frequently, some or all of the information requested on forms has already been provided to some entity or is otherwise already available in electronic form. Setting up a user data repository allows the user to make more information readily accessible via a communications network, regardless of whether the information was previously entered into a form. The user can add information to the user data repository, for example, by uploading documents and/or linking accounts (such as financial accounts, social media accounts, electronic mail accounts, etc.), from which information about the user can be extracted. Advantageously, the data in the user data repository can be made accessible only upon suitable authentication, helping secure the personal information. The data repository can include personally identifiable information (such as name, address, social security number, gender, age, etc.), biographical information (such as work history, prior addresses, names of siblings, etc.), financial information (such as credit card numbers, checking account numbers, investments, etc.), and preferences (such as electronic versus paper delivery of documents, use of particular credit cards with purchases of certain goods and services, delivery address for certain orders from particular merchants, etc.). Because the data repository is accessible via a network, it is accessible remotely from multiple computing devices. The data made accessible to the data repository can be used as-is (without modification), or as-interpreted based on context and aggregation of data. The sources of data can remain linked, such that as data is updated, corrected, or otherwise changed in one account, it becomes available for use in auto-population of forms. Users can thus save the time and inconvenience of re-entering information that is otherwise available electronically. The ability to have a data repository that is able to access up-to-date information from user accounts allows certain information to be made available for forms without the user having to enter it even once. For example, when a credit card is lost or stolen, a bank may issue a new credit card with a new number. If the user's credit account is linked with the data repository, the old number can be automatically replaced with the new credit card number without requiring the user to enter the new credit card number into any form or website, even before the replacement credit card has been received in the mail.

Figure 1:
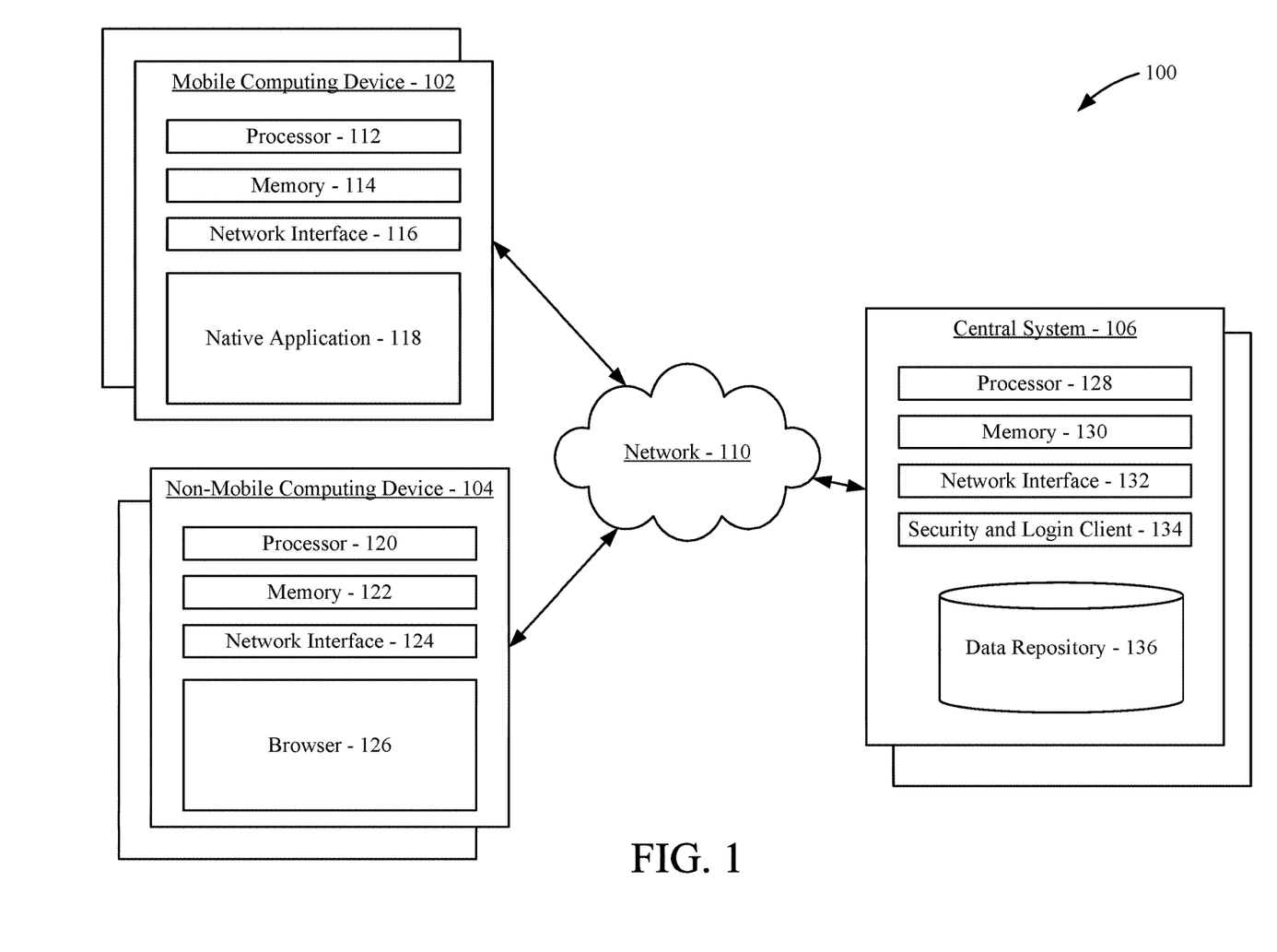
FIG. 1 is a diagram of an example computing system according to one or more embodiments.

Referring to FIG. 1, a block diagram of a computing system 100 is shown according to one or more example embodiments. As described herein, the computing system 100 enables automated population (i.e., automated entry of responses, selections, or other inputs) of forms via authenticated access to data in a centralized user data repository (also referred to as data repository). The computing system 100 includes a plurality of computing devices 102, 104 able to access a central system 106 via a network 110. The central system 106 provides a networked portal to allow users to access data associated with one or more user accounts. The computing device 102 may be, for example, a mobile computing device (such as a smartphone, tablet, laptop, etc.), and non-mobile computing device 104 may be, for example, a personal computing device (such as a desktop computer or workstation). The components of the computing system 100 are communicably and operatively coupled to each other over the network 110. The network 110 may be any type of type of network. For example, the network 110 may include a wireless network interface (e.g., 802.11X, ZigBee, Bluetooth, Internet, etc.), a wired network interface (e.g., Ethernet, USB, Thunderbolt, etc.), or any combination thereof. The network 110 is structured to permit the exchange of data, values, instructions, messages, and the like between computing devices 102, 104 and the central system 106.

Each mobile computing device 102 includes a processor 112, a memory 114, and a network interface 116. The processor 112 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the mobile computing device 102. The memory 114 (e.g., RAM, ROM, NVRAM, Flash Memory, hard disk storage, etc.) may store data and/or computer code for facilitating at least some of the various processes described herein. In this regard, the memory 114 may store programming logic that, when executed by the processor 112, controls the operation of the mobile computing device 102. The network interface 116 may be structured to allow the mobile computing device 102 to communicate data to and from other devices (such as central system 106) either directly or via the network 110. The mobile computing device 102 includes a native application 118 (which may be an application provided or authorized by the institution implementing central system 106) to allow users to communicate with central system 106.

Still referring to FIG. 1, each non-mobile computing device 104 includes a processor 120, a memory 122, and a network interface 124. The processor 120 may be implemented as a general-purpose processor, an ASIC, one or more FPGAs, a DSP, a group of processing components, or other suitable electronic processing components structured to control the operation of the non-mobile computing device 104. The memory 122 (e.g., RAM, ROM, NVRAM, Flash Memory, hard disk storage, etc.) may store data and/or computer code for facilitating at least some of the various processes described herein. In this regard, the memory 122 may store programming logic that, when executed by the processor 120, controls the operation of the non-mobile computing device 104. The network interface 124 is structured to allow the non-mobile computing device 104 to communicate data to and from other devices (such as central system 106) either directly or via the network 110. The non-mobile computing device 104 includes a browser 126 (such as Google Chrome, Microsoft Edge, Internet Explorer, or other application providing internet access) to allow users to communicate with central system 106.

The central system 106 includes a processor 128, memory 130, and a network interface 132. The processor 128 may be implemented as a general-purpose processor, an ASIC, one or more FPGAs, a DSP, a group of processing components, or other suitable electronic processing components structured to control the operation of the central system 106. The memory 130 (e.g., RAM, ROM, NVRAM, Flash Memory, hard disk storage, etc.) may store data and/or computer code for facilitating at least some of the various processes described herein. In this regard, the memory 130 may store programming logic that, when executed by the processor 128, controls the operation of the central system 106. The network interface 132 is structured to allow the central system 106 to communicate data to and from other devices (e.g., mobile device 102, non-mobile computing device 104, etc.) either directly or via the network 110. The computing system 100 may be arranged such that the central system 106 operates as a server, and computing devices 102, 104 operate as clients. The central system may include a security and login client 134 which may provide fraud prevention measures and security protections (such as authentication of user identities).

The central system 106 also includes a data repository 136 that can store information from various internal (i.e., within the same organization or entity) and external (i.e., maintained by other organizations and entities) user accounts. The data repository can be, for example, one or more databases with structured data, unstructured data, or a combination of structured and unstructured data. The data in the data repository 136 can be accessed via computing devices 102, 104. In certain versions, some or all of the data may be stored on separate local or remote computing devices that are accessible to, or via, the central system 106. For example, if the central system 106 is administered by (or on behalf of) a financial institution, the data repository 136 may include customer information from the financial account (referred to as an "internal" account) that is stored on a separate system that may be co-located with or remote to the central system 106.

Figure 2:
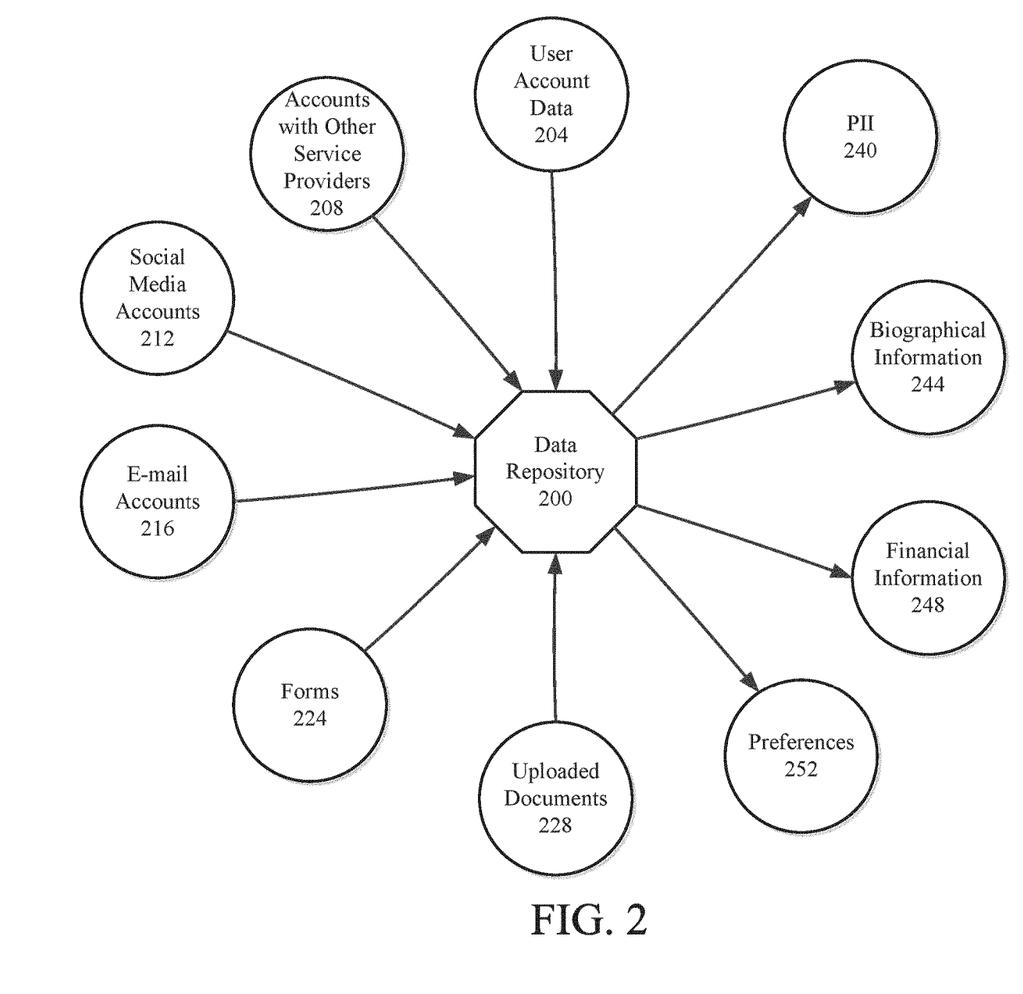
FIG. 2 is a data flow diagram of an example data repository according to one or more embodiments.

Referring to FIG. 2, an example data repository 200 may acquire information from one or more different sources, and may provide various types of information, examples of which are depicted in the drawing. If the data repository 200 is associated with a user account, then the data repository may retrieve or otherwise access user account data 204. It may be, for example, that the data repository 200 is maintained by an entity (such as a financial institution) through which a user already has an account (such as a credit card or checking account), and the user's profile data and financial information associated with the user account may be made available to the data repository 200. The data repository 200 may also receive user data from accounts with other service providers 208. These may include, for example, financial institutions, merchants, and any other organizations at which a user has registered for, or otherwise holds, an account.

The data repository 200 may also receive data from social media accounts 212, such as LinkedIn, Facebook, and Twitter, as well as electronic mail accounts 216, such as Microsoft Exchange and Gmail. Additionally, the data repository 200 may receive data using forms 220 intended to solicit information that the user wishes to make available for automated population of query fields. Moreover, the user may provide data to the data repository 224 via uploaded documents 228. This allows the user to provide information that might not be available electronically or that might not be available through access to other accounts. For example, the user may upload a scanned copy of a credit card application, driver's license application, etc., and data can be extracted from the documents for future use. The more data made available to the data repository, the "richer" the repository as a source of potential responses.

The data repository may provide, for use in completing forms, personally identifiable information (PII) 240, such as full name, birthdate, social security number, gender, age, home address, and employer. These may be obtained from, for example, the user account data 204, the accounts with other service providers 208, via forms 224, or any other source. The data repository may also provide biographical information 244, such as work history, education, relationships (such as spouse and siblings), and prior home addresses. Biographical information may be available through any of the sources depicted in FIG. 2, or other sources. The data repository may additionally provide financial information 248, such as credit card numbers, checking and savings account numbers, investments, etc. These would likely be obtained from the user account data 204, accounts with other service providers 208, electronic mail accounts 216, forms 224, uploaded documents 228, or other sources. Further, the data repository 200 may provide information on preferences 252. Examples of preferences include, for example, whether electronic delivery or paper delivery of documents is desired, which credit cards are used with certain goods and services or with particular merchants, shipping addresses for certain items or from particular merchants, etc. These might be obtained through accounts 204, 208, social media accounts 212, and electronic mail accounts 216. It is noted that these four classifications/types of information are only intended to be illustrative or representative of the sorts of information that can be obtained via the data repository. These categories may overlap, and they do not necessarily represent all sorts of information that can be provided by the data repository.

The data that is made available via the data repository may be "raw" (as-is), or it may be, for example, processed, interpreted, translated, gleaned, carved out, aggregated, or predicted. For example, certain financial information is more suitably provided in raw form, such as the exact credit card number obtained from a user financial account or as submitted by the user in a form. In some cases, the data repository may provide information that is not provided in as-is form. For example, if a user has submitted a scanned copy of a credit card application identifying the user's employer, the raw image of the answer (e.g., the handwritten name of the employer) may not be provided, but instead, the name of the employer as determined based on optical character recognition (OCR) of the scanned page. As another example, a user's marital status may be gleaned from postings in a social media account.

It is noted that data repository 200 need not store (copies of) all the information available through the identified (or other) sources. In certain embodiments, the data repository 200 stores information needed to access the data from the other sources (such as URLs and login credentials), but does not maintain a separate copy of the data accessible from the other sources. In other embodiments, the data repository 200 may store copies of the data that are available from the various sources of data. In yet other embodiments, the data repository 200 may store copies of certain data or data from certain sources, but not maintain copies of certain other data or data from other sources. For example, the data repository 200 may include a subset of all data from a source as selected based on the likelihood that the data would be useful for generating a response for a query field. With respect to biographical information, for example, it may be useful to have a copy of the user's work history for the past two years, but not maintain work history dating further back. As another example, the data repository 200 may hold a copy of data from certain sources that are believed to be less reliably accessible, while not holding a copy of data that may be from a reliable source but that is ephemeral in its applicability or more prone to frequent change.

An advantage of the former approach (i.e., not keeping a copy of data) is that costs can be reduced, as less data storage and maintenance is involved. Also, with the former approach, the latest version of available data is necessarily used, as it is accessed/retrieved on a when-needed basis. An advantage of the latter approach is that the data is more readily available without the need to access the other source, reducing delays resulting from the need to access the other data sources. It is noted that, if a copy is maintained, it can be updated according to a preset schedule or on a regular basis (such as daily, weekly, or monthly).

Even if a copy of the "raw" data from one or more sources is not maintained in the data repository 200, the metadata derived from available data can be maintained in data repository 200. For example, using data from one or more sources, it can be determined that the user regularly orders office supplies to be shipped to a certain business address using a particular business credit card. Although the raw data on the orders themselves (i.e., what items were ordered, quantities ordered, cost of each item, dates ordered, merchants used, etc.) is not stored, the metadata (e.g., an identification of the class of goods, the business address used as the shipping address, the credit card selected, etc.) can be maintained in the data repository.

It is noted that the accounts and documents from which data are obtained for the data repository 200 need not necessarily be accounts of the user, but could additionally be accounts and documents of others (such as a spouse) with information about the user. It is also noted that the rules and policies for access, transmission, and storage of personal data applicable to the data repository may be modified and tailored to comply with all applicable laws and regulations (such as HIPPA) and to satisfy any applicable contractual duties.

Figure 3:
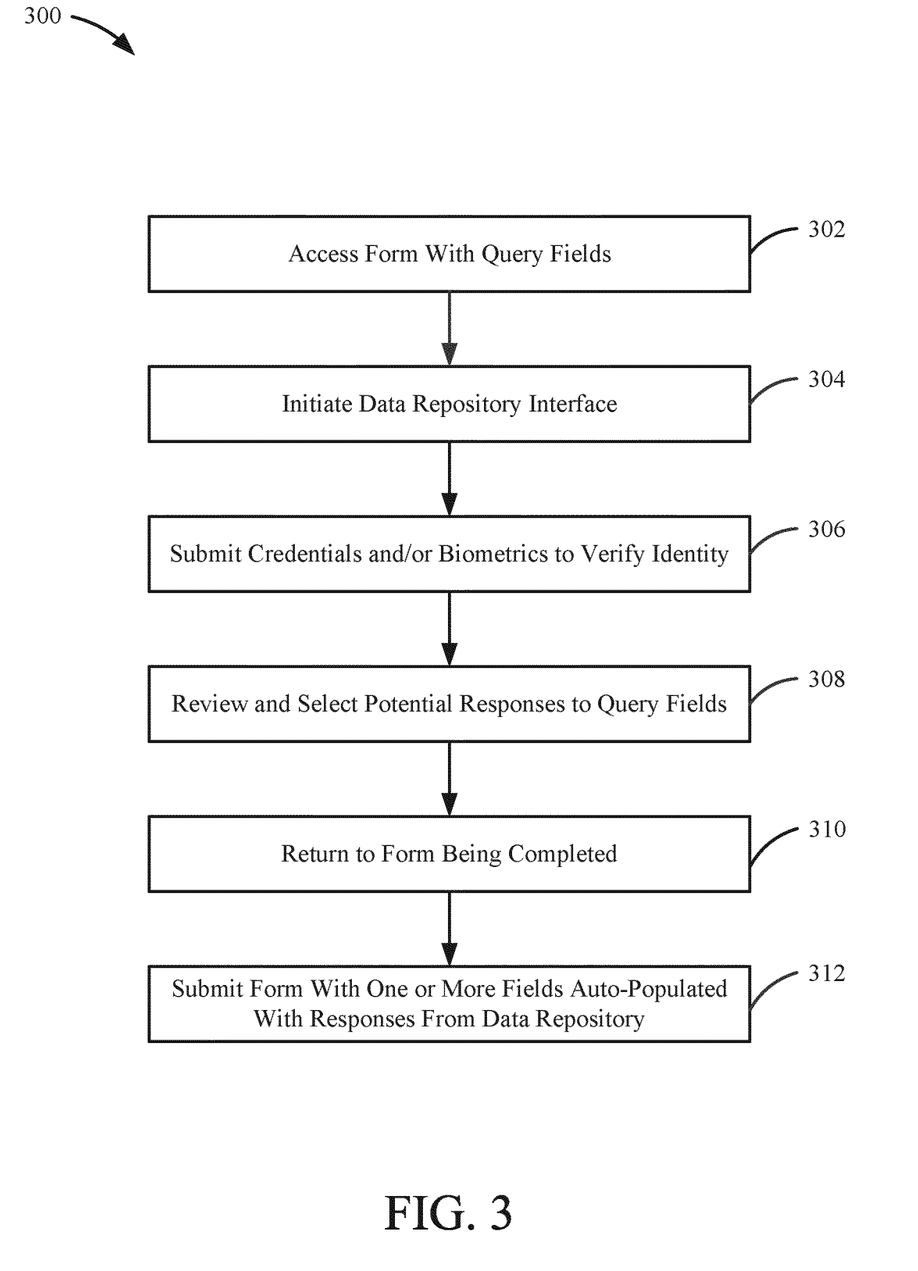
FIG. 3 is flow diagram of an example automated population method implemented on a user computing device according to one or more embodiments.
Figure 6:
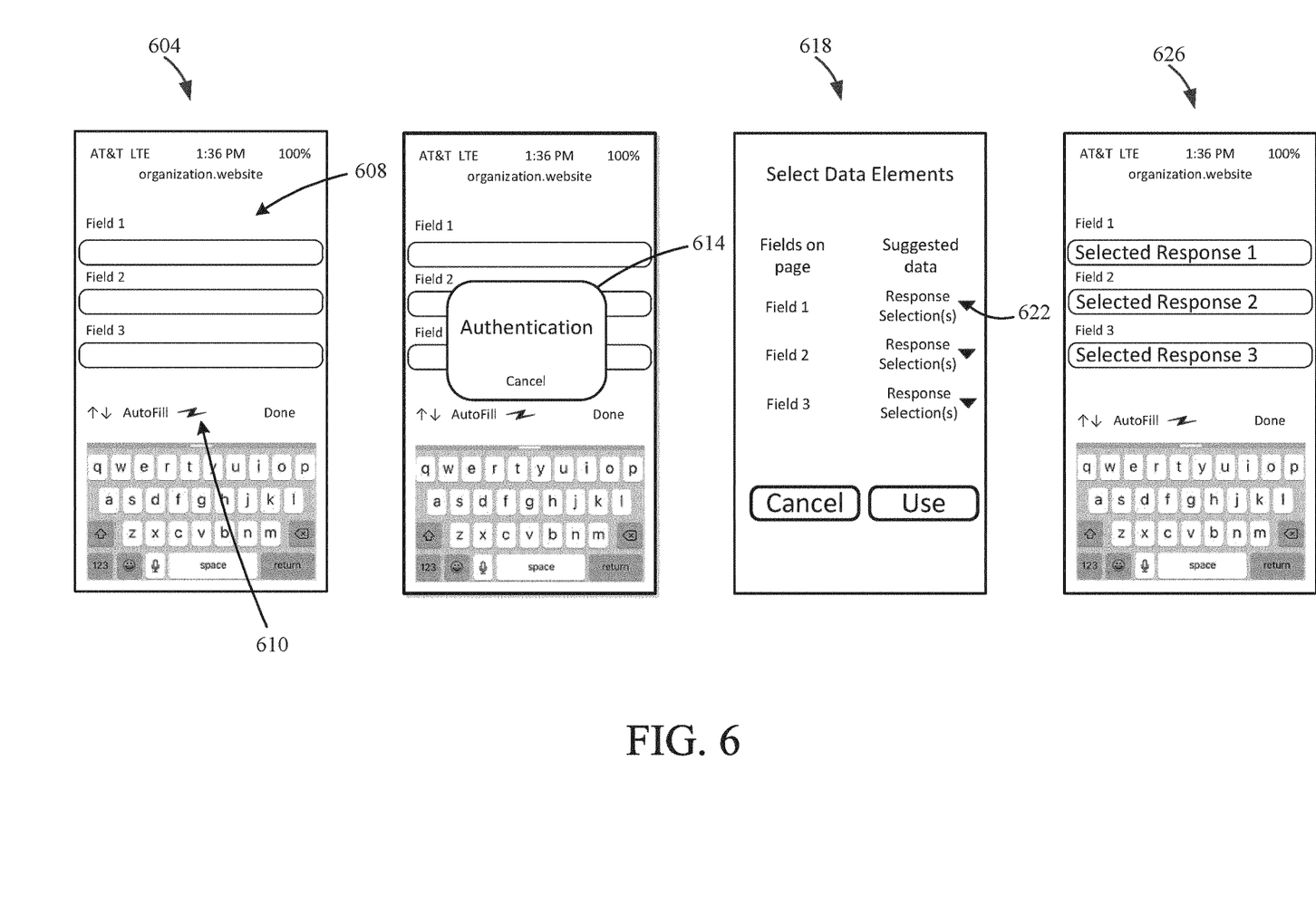
FIG. 6 provides a set of illustrative representations of mobile device screenshots for an example automated population approach according to one or more embodiments.

Referring to FIGS. 3 and 6, an example method 300 for using a data repository is described according to various embodiments. The method 300 may be performed by a computing device 102, 104. Generally, at 302, a user accesses a form (such as form 604, accessed through the website "organization.website," in FIG. 6) that includes one or more query fields (608 in FIG. 6, showing three query fields labeled Field 1, Field 2, and Field 3). Although only text boxes are shown in FIG. 6, query fields of fillable forms are not limited to simple text boxes, and can be, for example, password fields, radio buttons, check boxes, select (pull-down) boxes, or other means of obtaining information.

At 304, the user may initiate (by, for example, selecting link icon 610 in FIG. 6) a data repository interface (such as interface 618 in FIG. 6). At 306, the user may submit credentials (such as a username and password) or biometrics (such as fingerprints or facial features) to verify his or her authorization to access data in the data repository (see 614 in FIG. 6). Authentication of the user may employ any process deemed suitable, known now or developed in the future, such as the use of security questions, security tokens, etc. Embodiments of the present disclosure are not limited to particular means of verifying identity or authorization to access an account. The security requirements may be based, in part, on the sort of data that is contained in the data repository. For example, if the data repository includes financial data, it may be desirable to employ stricter security protocols than if the data repository does not include financial data.

The user may be provided with a list of potential responses to the query fields (618 in FIG. 6), and at 308, the user reviews the potential responses and, if multiple responses are available, selects from available responses for one or more of the query fields (e.g., via drop-down icon 622 in FIG. 6). At 310, the user may choose to return to the form being completed (by, for example, selecting "Cancel" to return to the form without any responses, or "Use" to return to the form with selected responses). The query fields are then automatically populated with corresponding responses (see 626 in FIG. 6), and at 312, the user may submit the form with fields auto-populated with responses retrieved via the data repository.

It is noted that the link icon is only an illustration, and may be replaced by any graphical or textual button. In certain embodiments, the link icon can be replaced with other input means, such as voice input (such as by speaking a word or phrase such as "autofill") or other input means. Advantageously, use of the link icon (or other input means) that is an extension of a web browser or mobile device application avoids the need to have each form include a button for engaging a data repository interface.

It is noted that this method need not be implemented as an independent application. In certain embodiments, an application programming interface (API) may be provided to allow the desired functionality to be incorporated with web browsers and other network applications, such as mobile device applications. Advantageously, incorporation of this functionality into, for example, a browser, mobile device application, or other network application allows users to continue to use their chosen applications, which may be more feature-rich and robust than an independent application used primarily to implement the disclosed automated query field population schemes.

It is also noted that the responses that are automatically filled into query fields of forms, in certain embodiments, are not retained locally. Once a form is submitted, the responses may be cleared from the network application. This helps maintain security of personal information, and also helps ensure that the responses inserted into query fields are based on the most up-to-date data in the data repository.

Figure 4:
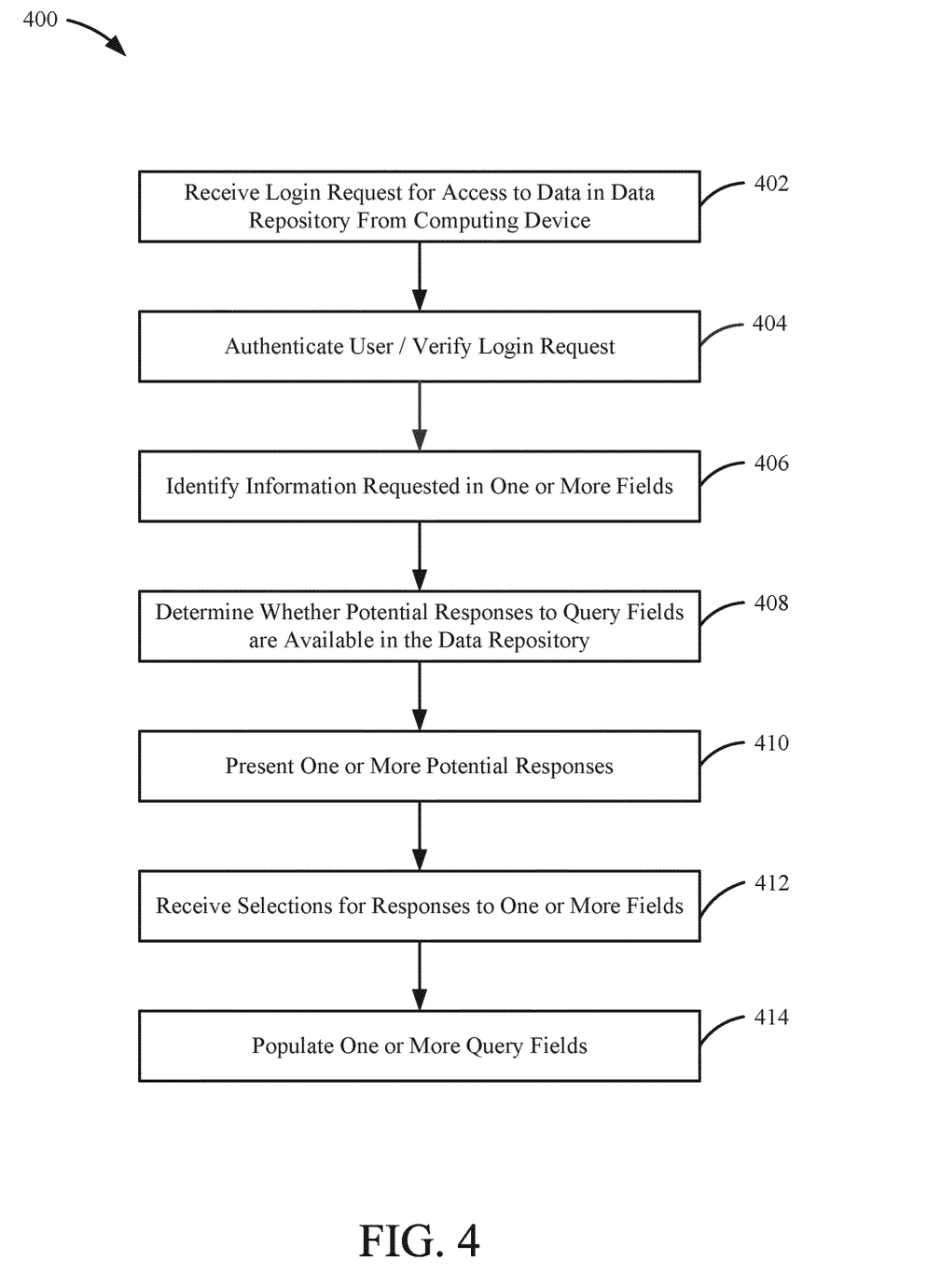
FIG. 4 is a flow diagram of an example automated population method implemented on a central computing device according to one or more embodiments.

Referring to FIG. 4, an example method 400 for providing responses obtained via a data repository is described according to various embodiments. The method 400 may be performed using a central system 106. Generally, at 402, the central system 106 may receive (from computing device 102, 104) a login request for access to data in a data repository. At 404, the central system 106 may authenticate the user, or otherwise verify the login request, in evaluating whether the user is authorized to access the data repository. Authentication of the user may employ any process deemed suitable, known now or developed in the future, such as the use of login credentials (such as username and password), security questions, security tokens, etc. Embodiments of the present disclosure are not limited to particular means of verifying identity or authorization to access an account. The security requirements may be based, in part, on the sort of data that is contained in the data repository. For example, if the data repository includes financial data, it may be desirable to employ stricter security protocols than if the data repository does not include financial data.

At 406, the central system 106 identifies the information requested in one or more query fields of the form. This may involve receiving from the computing device 102, 104 the field descriptors (examples of which are labeled Field 1, Field 2, and Field 3 in FIG. 6), which may be, for example, "Last name," "First name," "Address," "Country," etc. Field descriptors can, in various embodiments, be any terms, codes, numbers, references, etc., that identify the information sought by one or more query fields. Often, this is a term or short phrase that names what is being sought, such as "credit card number" or "date of birth," but field descriptors may be less explicit or certain. If there is ambiguity in what information is requested, the central system 106 may predict what information is sought by looking at context (e.g., other fields, other parts of the form, source/provider of the firm, etc.). For example, a descriptor of "Country" may be interpreted as requesting the country of residence if it follows (or is near) address fields, or it may be deemed to request country of citizenship if it follows a field descriptor of "Place of birth." An ambiguity may also be resolved by looking at the source of the form, such that a request for country of citizenship is more likely in a form related to foreign travel than in a form for submitting payment to an online merchant. Ambiguities may also be evaluated based on other text in the form, such as the title of the form and section headings/subheadings.

It is noted that field descriptors are not limited to viewable labels (such as "name") that are often found adjacent to query fields (such as an empty text field), and the information being sought by a query field may, alternatively or additionally, thus be determined in other ways as well. In various implementations, field descriptors may include terms in non-English languages, may be in computer or other code, may use abbreviations and shortcuts (such as SSN for social security number, or DOB for date of birth), may include one or more references to other data, such as links to other segments of a form, other websites, databases, etc., or may otherwise require translation, interpretation, or retrieval of additional data before it can be determined what information is being sought by a query field. Field descriptors may also include metadata accompanying, or incorporated with, the form or one or more query fields, and field descriptors may be found in the comments of a piece of code (such as a comment in HTML or other code of a webpage or application used to present the form).

Once the requested information is identified, at 408, the central system 106 may determine whether responses to the query fields are available in the data repository. This may involve, for example, a search of the data repository for field descriptors (or variations thereof). A search may reveal a match for a field descriptor; for example, the term social security number or an abbreviation of SSN may be found in the data repository, along with a value (i.e., a social security number) for the field descriptor. The value or values associated with the field descriptor may then be retrieved from the data repository and offered as options for responses to the query fields, or the value/values may be directly used to populate one or more query fields (without being presented as an option).

It is noted that an exact match may be required for some or all terms (such as "SSN" or "date of birth"), or deviations from an exact match may be permitted. For example, the system may retrieve a value for social security number or driver's license number in the data repository as a potential response to a query field with a field descriptor of "identification number," or similarly, may retrieve a value for maiden name in the data repository as a potential response to a query field with a field descriptor of "previous name" or "former name" or "other names used." Deviations may thus be synonyms or alternative terminology or phraseology for information being requested (such as "cell number" for "mobile number" or "phone number"), and may be predetermined (e.g., in a database of the data repository that includes a list of terms and phrases and, for each term or phrase, corresponding other terms that may be acceptable substitutes), or determined as needed (e.g., if there is an ambiguity or in case no exact matches are found or potential responses are otherwise deemed insufficient) by accessing other information sources, such as online dictionaries, wiki pages, or other resources. Once the field descriptor (or a variation thereof, or acceptable deviation therefrom) is found, the values for the field descriptor (i.e., potential responses to the query fields) may be found by looking, for example, for values adjacent to or near the field descriptor. For example, if the same field descriptor is found in another form, the potential response value may be found by looking at text that follows a colon or that is just below the field descriptor or that is underlined or boxed. If the field descriptor is found in the text of a document (such as an e-mail), the value may be found in the same sentence, in a new paragraph, etc. It is noted that the search for response values may be informed by reference to the sort of data that would be expected to be responsive to the query field. For example, a nine-digit number may be sought for a social security number, a number followed by a letter may be sought for a driver's license number of a particular state, letters-only values may be sought for names, etc.

In some embodiments, determining whether responses to the query fields are available in the data repository additionally or alternatively may include accessing external accounts to find relevant/responsive data, and/or processing of data available to the data repository. Data processing may use any algorithms and/or any machine learning/artificial intelligence techniques and approaches deemed suitable to finding and extracting the requested information. For example, if a seven digit number is found in the data repository near the field descriptor for a phone number, it may be determined that the area code is missing, and the potential full phone number (with area code) may be determined based on the mailing address or zip code of the person with whom the phone number is associated (e.g., by reference to a database, which may be in the data repository or available via the internet or other networked information sources, that associates zip codes with area codes). If more than one potential response is found (for example, if more than one area code may be associated with a zip code, or if multiple area codes are found in the data repository as potentially belonging to the user), a user may be presented with the potential responses and allowed to select one. It is noted that a user may be provided with an opportunity to correct or reject proposed responses in case predictions about missing or incomplete information are not correct.

At 410, the user may be presented with one or more potential responses to one or more query fields. The responses may have been found "as is" in the data repository, or gleaned based on available information (such as a phone number with an area code based on address). One, some, or all of the query fields may have none, one, or multiple potential responses presented to the user. Then, at 412, the central system 106 may receive the selections of responses where multiple potential responses were found. In embodiments in which selections are received by the central system 106, the system may learn which responses may be inaccurate or deemed irrelevant by the user, so that responses that continue to be unused are not presented in perpetuity. Alternatively, the central system 106 does not receive the selections. At 414, the query fields may be populated with accepted/selected responses.

Figure 5:
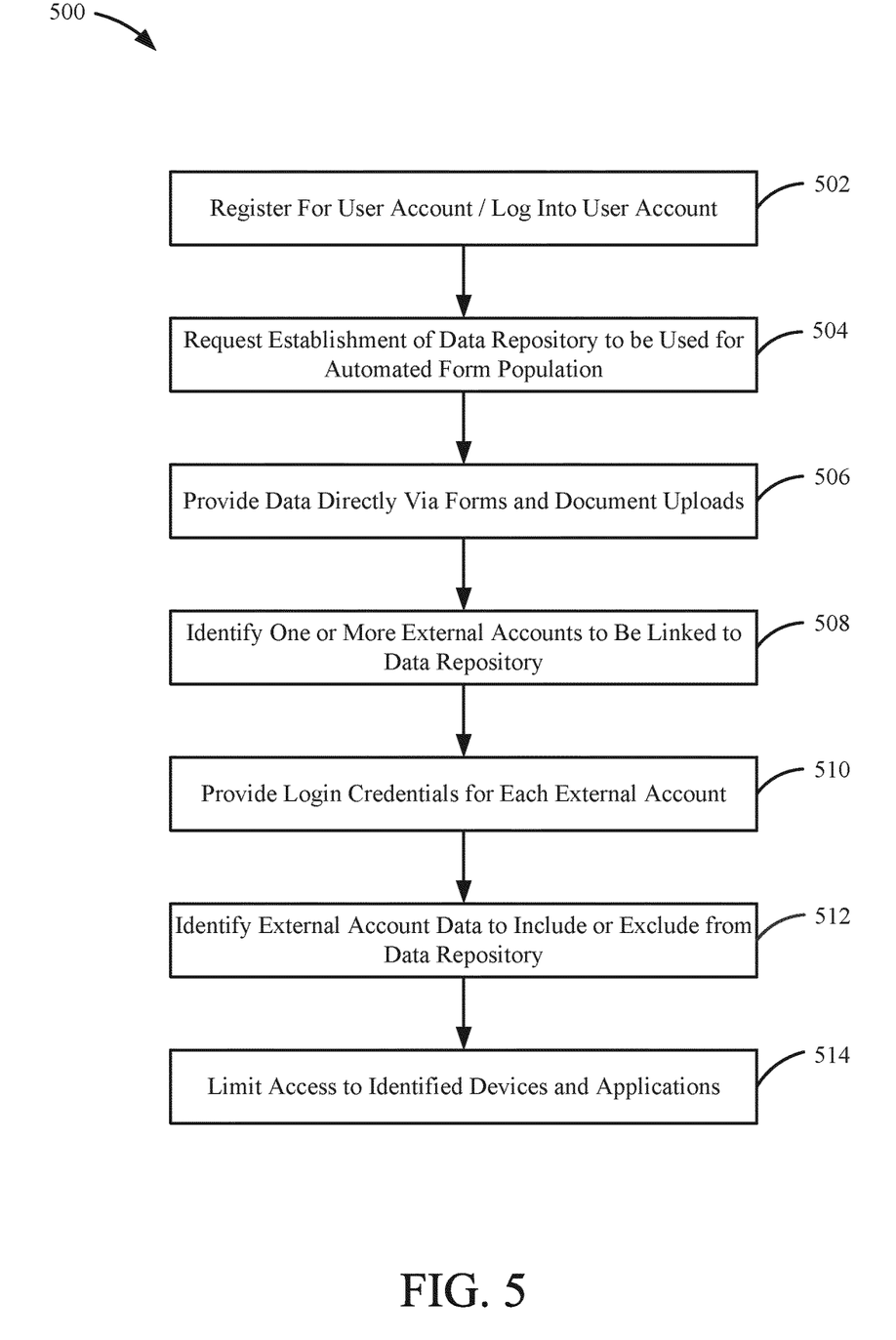
FIG. 5 is a flow diagram of an example automated population setup method according to one or more embodiments.

Referring to FIG. 5, an example method 500 for setting up a data repository is described according to various embodiments. At 502, a user may register for a user account, or if already registered, log into his or her user account. The user account may be an existing user account, such as credit card or bank account at a financial institution. Or, there may be no existing account, and the user is newly registering to establish a data repository account. At 504, the user requests that a data repository be established for use in automated form population. The user may optionally, at 506, provide data directly (i.e., not via linked accounts) by providing responses via forms generated by the data repository system, or via uploads of documents. Such documents may be in any format that is readable to the system, such as Adobe PDF, Microsoft Word, Microsoft Excel, and image files (such as jpegs and PNG files). At 508, the user identifies one or more external accounts to be linked to the data repository. At 510, the user provides login credentials (such as username and password), answers to security questions, biometric data (such as fingerprint data, an audio file with words spoken by the owner of the account, etc.), or any other information required to access the external accounts, and performs any other required authentication steps (such as responding to an e-mail with a URL that, if selected, confirms access should be granted). Once authenticated, the system may scrape, extract, or otherwise retrieve user data from the external accounts using, for example, web crawlers or other software robots. It is noted that certain sources of information may be publicly available, such as a public blog or a publicly available Facebook page, in which case the data repository may be directed to the appropriate webpages (e.g., by being provided with a URL) without the need for login credentials.

At 512, in certain embodiments, the user may choose to include or exclude certain information from the external accounts. For example, the user may choose to allow the data repository to access the user profile in a social networking account, but not the updates/posts. The user may also be allowed to choose whether access is granted one time, or multiple times so that the data in the data repository can be subsequently updated to reflect the current information in the external accounts. It is noted that, if the user only grants one-time access to an external account at registration, then the data repository would retain a copy of selected data elements from the external accounts following access, as it is not an option for the data repository to only access the external account on an as-needed basis in the future. At 514, in certain embodiments, the user may limit data repository access to identified devices and applications. Such steps allow the user to maintain better control over what data is made available to the data repository. Advantageously, select user data need not be provided by the user, but rather may be obtained in an automated fashion directly by, for example, a central computing system. Updates to data in user accounts need not be provided multiple times (e.g., once to the entity maintaining the user account, and again to the entity maintaining the data repository), as the central computing system can obtain current data (as updated by the user) from, for example, user accounts maintained in third-party computing devices.

The above-described systems and methods provide for a more convenient way for users to more easily and quickly fill out forms. Authentication helps ensure that responses, which can include very personal/sensitive information, are not filled into forms of unauthorized users. Because the data is not stored locally, it can be more secure and readily available using multiple devices. A "cloud-based" approach also helps ensure that the most recent data is used to autofill fields in forms, requiring the user to update his or her information once via the user account. The ability to have a data repository that is able to access up-to-date information from user accounts allows certain information to be made available to forms even before it is available to (or at least retrieved or accessed by) the user, such as new credit card numbers.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method for automated population of one or more responses into one or more query fields of a form, wherein the responses are based on data in a networked user data repository maintained by a first party that is a financial institution holding one or more financial accounts of a user, and wherein the form is presented to the user by a second party, the method comprising:

maintaining the data repository at a central system of the financial institution, the data repository including:

internal data from the one or more financial accounts of the user maintained by the financial institution in one or more internal databases; and external data acquired by the central system from one or more third party computing devices via the communications network, the external data being associated with one or more user accounts maintained by the third party computing devices in one or more external databases, wherein the central system accessed the external data maintained by the third party computing devices by providing authenticating information to the third party computing devices;

receiving, from a user computing device of the user and via a communications network, a login request for access to data in the user data repository, the login request having been received via a network application through which the user is presented with the form, the network application being executed on the user computing device;

determining whether to authorize access to the data in the user data repository in response to the login request, wherein determining whether to authorize access to the data is based on a security protocol determined based on a type of the data in the user data repository;

in response to access to the data in the user data repository being authorized:

i) obtaining one or more descriptors for at least one of the query fields, the one or more descriptors characterizing responses requested by the second party via corresponding query fields;

ii) determining, based on a descriptor of a first query field, that there is an ambiguity as to whether a first information is requested by the first query field or a second information is requested by the first query field;

iii) identifying a source of the first query field with the ambiguity and a second descriptor of a second query field;

iv) generating, based on the identified source and the second descriptor of the second query field, a prediction that either the first information is requested or the second information is requested;

v) determining, based on the prediction, whether any responses to the first query field with the ambiguity are contained in the user data repository;

vi) sending, to the user computing device, one or more responses more of the first query field in the form; and vii) populating, via the network application, the first query field with at least one of the responses obtained through the networked user data repository.

2. The method of claim 1, wherein the method is implemented by a central system of the first party, the central system being communicatively coupled with the user computing device via the communications network.

3. The method of claim 2, wherein the central system is further communicatively coupled to a third-party computing device of a third party, and wherein the central system is configured to receive user data from the third-party computing device for storage in the data repository.

4. The method of claim 1, wherein the form is automatically populated with information provided to the first party without having the user re-input the information into the form of the second party.

5. The method of claim 1, further comprising submitting the form via the network application, the submitted form including one or more query fields populated with responses obtained through the networked user data repository.

6. The method of claim 1, wherein the network application is a web browser or a mobile device application.

7. The method of claim 1, wherein determining whether any responses to any query fields are contained in the data repository comprises searching one or more documents in the data repository for the field descriptors, and retrieving values near the field descriptors in documents with the field descriptors.

8. The method of claim 7, further comprising searching one or more documents in the data repository for synonyms of terms in the field descriptors to determine whether any responses to any query fields are contained in the data repository.

9. The method of claim 1, wherein determining whether to authorize access to the data in the user data repository includes receiving user credentials entered by the user into the user computing device, and authenticating the user based at least in part on the credentials received.

10. The method of claim 1, wherein the login request is received after the user computing device authenticates the user.

11. The method of claim 10, wherein the user computing device biometrically authenticates the user after the user requests, via the network application, access to data in the user data repository.

12. The method of claim 1, wherein the user data repository includes data extracted from one or more social media accounts of the user.

13. The method of claim 1, wherein the user data repository includes data extracted from one or more documents uploaded by the user prior to being presented with the form.

14. The method of claim 1, wherein the user data repository includes data extracted from one or more electronic mail accounts of the user.

15. The method of claim 1, wherein the user data repository is associated with the one or more financial accounts of the user held by the first party, and wherein determining whether to authorize access to the data in the user data repository includes authenticating the user as though the user is accessing the financial account.

16. The method of claim 1, wherein the user data repository includes data extracted from one or more financial accounts held by a third party.

17. The method of claim 1, wherein the user data repository is linked with one or more external accounts maintained by parties other than the first and second parties such that data that is updated in the external accounts subsequent to account linking is accessible to the user data repository.

18. The method of claim 1, further comprising, before determining whether any responses to any of the query fields are contained in the user data repository, accessing one or more of the at least one third party account to retrieve, from one or more corresponding third party computing devices, data corresponding to at least one of the field descriptors.

19. The method of claim 1, further comprising:
presenting, via a display, multiple potential responses available for one of the query fields in the form; and
accepting, via a user interface associated with the display, a selection of one of the multiple potential responses for the corresponding query field, wherein the corresponding query field is populated with the selection.

20. The method of claim 1, wherein determining, based on the one or more descriptors, whether any responses to any query fields are contained in the user data repository comprises:
searching one or more documents in the data repository for the field descriptors; and
retrieving values near the field descriptors in documents with the field descriptors.

21. A central system for automated population of one or more responses into one or more query fields of a form, the central system being associated with a financial institution with one or more financial accounts of a user, the central system including:
a network interface, wherein the central system is communicatively coupled with a user computing device of the user via the network interface;
a user data repository including information responsive to one or more query fields of the form;
a processor; and
a memory having instructions that, when executed by the processor, are configured to direct the central computing device to:
maintain, in the data repository:
internal data from the one or more financial accounts of the user maintained by the financial institution in one or more internal databases; and
external data acquired by the central system from one or more third party computing devices via the network interface, the external data being associated with one or more user accounts maintained by the third party computing devices in one or more external databases, wherein the central system accessed the external data maintained by the third party computing devices by providing authenticating information to the third party computing devices;
receive, from the user computing device and via the network interface, a login request for access to data in the user data repository, the login request having been received via a network application through which the form is presented, wherein the network application is executed on the user computing device, and wherein the form is presented by a second party;
determine whether to authorize access to the data in the user data repository in response to the login request, wherein determining whether to authorize access to the data is based on a security protocol determined based on a type of the data in the user repository;
in response to access to the data in the user data repository being authorized:
i) obtain from the user computing device one or more descriptors for at least one of the query fields, the one or more descriptors characterizing responses requested by the second party via corresponding query fields;
ii) determining, based on a descriptor of a first query field, that there is an ambiguity as to whether a first information is requested by the first query field or a second information is requested by the first query field;
iii) identifying a source of the first query field with the ambiguity and a second descriptor of a second query field;
iv) generating, based on the identified source and the second descriptor of the second query field, a prediction that either the first information is requested or the second information is requested;
v) determine, based on the prediction, whether any responses to the first query field with the ambiguity are contained in the user data repository;
vi) send, to the user computing device, one or more responses to the first query in the form; and
vii) populate, via the network application, the first query field with at least one of the responses obtained through the networked user data repository.

22. The system of claim 21, wherein, to determine whether any responses to any query fields are contained in the data repository, the central system is further configured to:
- search one or more documents in the data repository for the field descriptors; and
- retrieve values near the field descriptors in documents with the field descriptors.

23. The system of claim 21, further comprising the user computing device with which the central system is communicatively coupled, wherein:
- the user computing device is configured to transmit, to the central system, user credentials entered by a user into the user computing device; and
- the central system is further configured to determine whether to authorize access to the data in the user data repository based at least in part on the user credentials.

24. The system of claim 21, wherein the central system is further configured to obtain, for the user data repository, data from at least one of a social media account, an electronic mail account, and a financial account of a user presented with the form to be completed.

25. The system of claim 21, wherein the user data repository is associated with the one or more financial accounts of the user held by the financial account, and wherein the central system is configured to determine whether to authorize access to the data in the user data repository by authenticating the user as though the user is accessing the financial account.

26. The system of claim 21, wherein the central system is further configured to, before determining whether any responses to any of the query fields are contained in the user data repository, access one or more of the at least one third party user account to retrieve data corresponding to at least one of the field descriptors.

27. The system of claim 21, wherein the central system is further configured to:
- present to the user computing device, multiple potential responses available for one of the query fields in the form; and
- accept a selection from the user computing device of one of the multiple potential responses for the corresponding query field, wherein the corresponding query field is populated with the selection.

28. A computer-implemented method for automated population of one or more responses into one or more query fields of a form, wherein the responses are based on data stored in a networked user data repository maintained by a financial institution, wherein the networked user data repository is maintained in a central system of the financial computing system and includes internal data from one or more financial accounts of the user held by the financial institution and external data obtained from one or more third party computing devices with data from one or more third party user accounts, and wherein the form is presented to a user by a second party, the method comprising:
- providing, via a web browser or mobile application executed on a user computing device, an autofill link for requesting access to data stored in the user data repository;
- upon selection of the autofill link by the user, authenticating the user of the user computing device as being authorized to access the one or more financial accounts of the user held by the financial institution, wherein authenticating the user of the user computing device as being authorized to access the one or more financial accounts is based on a security protocol determined based on a type of the data in the user data repository;
- transmitting, to a central system and via a communications network, a login request for access to data in the user data repository, the login request being transmitted via the web browser or mobile application through which the user is presented with the form;
- providing to the central system one or more descriptors for at least one of the query fields, the one or more descriptors characterizing responses requested, by the second party, via corresponding query fields;
- determining, based on a descriptor of a first query field, that there is an ambiguity as to whether a first information is requested by the first query field or a second information is requested by the first query field;
- identifying a source of the first query field with the ambiguity and a second descriptor of a second query field;
- generating, based on the identified source and the second descriptor of the second query field, a prediction that either the first information is requested or the second information is requested;
- determining, based on the prediction, whether any responses to the query field with the ambiguity are contained in the user data repository;
- receiving, from the central system, one or more responses, based on the prediction, to the first query field in the form; and
- populating, via the web browser or mobile application, the first query field with at least one of the responses obtained from the networked user data repository.

29. The method of claim 28, further comprising the user submitting the form with one or more automatically-populated query fields, wherein the user provides the second party with information previously provided to the first party without separately inputting the information into the form of the second party.

30. The method of claim 28, further comprising, before populating one or more query fields with responses:
- presenting to the user multiple potential responses available for one of the query fields in the form; and
- accepting a selection from the user of one of the multiple potential responses for the corresponding query field, wherein the corresponding query field is populated with the selection.

* * * * *